(12) United States Patent
Elfers (10) Patent No.: US 11,784,526 B2
(45) Date of Patent: Oct. 10, 2023

(54) COOLING SYSTEM FOR ELECTRIC MOTOR BUSBAR, STATOR AND COILS

(71) Applicant: Schaeffler Technologies AG & Co. KG, Herzogenaurach (DE)

(72) Inventor: Tyler Elfers, Akron, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 164 days.

(21) Appl. No.: 17/182,587

(22) Filed: Feb. 23, 2021

(65) Prior Publication Data

US 2021/0273512 A1 Sep. 2, 2021

Related U.S. Application Data

(60) Provisional application No. 62/983,100, filed on Feb. 28, 2020.

(51) Int. Cl.
*H02K 1/32* (2006.01)
*H02K 9/197* (2006.01)
*H02K 3/24* (2006.01)
*H02K 5/20* (2006.01)

(52) U.S. Cl.
CPC .............. *H02K 1/32* (2013.01); *H02K 3/24* (2013.01); *H02K 5/203* (2021.01); *H02K 9/197* (2013.01)

(58) Field of Classification Search
CPC .......... H02K 5/203; H02K 3/24; H02K 9/197; H02K 1/32; H02K 5/20; H02K 9/19; H02K 9/193
See application file for complete search history.

(56) References Cited

U.S. PATENT DOCUMENTS

| 2004/0145252 | A1 | 7/2004 | Arimitsu et al. | |
| 2005/0151429 | A1 | 7/2005 | Taketsuna et al. | |
| 2007/0145836 | A1* | 6/2007 | Bostwick | H02K 9/00 310/71 |
| 2007/0210656 | A1 | 9/2007 | LaFontaine et al. | |
| 2010/0296950 | A1* | 11/2010 | Kataoka | F04C 23/02 417/410.1 |
| 2013/0140924 | A1 | 6/2013 | Glubrecht | |
| 2016/0006302 | A1* | 1/2016 | Gugel | H02K 3/24 310/54 |
| 2018/0274522 | A1* | 9/2018 | Airoldi | F03D 9/25 |
| 2019/0081529 | A1* | 3/2019 | Rehr | H02K 9/197 |
| 2019/0312488 | A1* | 10/2019 | Latulipe | B60K 11/02 |
| 2020/0014266 | A1* | 1/2020 | Oechslen | H02K 9/197 |

FOREIGN PATENT DOCUMENTS

KR 20-0284488 Y1 8/2002

\* cited by examiner

*Primary Examiner* — Tulsidas C Patel
*Assistant Examiner* — Robert E Mates
(74) *Attorney, Agent, or Firm* — Volpe Koenig (57) ABSTRACT

A coolant flowpath configuration for an electric motor is disclosed herein. The coolant flowpath configuration includes a coolant flowpath channel defined on a radially outer surface of a stator lamination pack. The coolant flowpath channel includes: a first axial end defined radially outward from a first set of coils; and a second axial end defined radially outward from a second set of coils that is remote from the first set of coils.

20 Claims, 9 Drawing Sheets

COOLING SYSTEM FOR ELECTRIC MOTOR BUSBAR, STATOR AND COILS

INCORPORATION BY REFERENCE

This application claims priority to U.S. Provisional Application No. 62/983,100, which was filed Feb. 28, 2020, and is incorporated herein by reference in its entirety.

FIELD OF INVENTION

The present disclosure relates to a cooling system.

BACKGROUND

There is a demand to provide cooling systems that use electric motor components. However, there are issues in these cooling systems with routing a secondary cooling flow through the transmission housing. There is insufficient space, particularly in the radial direction, between the electric motor and the transmission housing of existing configurations.

To meet performance requirements, coolant (i.e. cooling fluid, oil, etc.) must be able to contact both sides of the electric motor coils to provide sufficient and even heat transfer. With reference to the drawings, it is difficult to provide coolant flow to the remote or right-hand side of the electric motor.

It would be desirable to provide a reliable and efficient way to provide oil or coolant flow to a remote portion of the stator coils in an electric motor.

SUMMARY

A cooling system is disclosed herein that provides an improved coolant flow arrangement to cool a remote end of the stator and its coils.

A coolant flowpath configuration for an electric motor is also disclosed herein. The coolant flowpath configuration includes a coolant flowpath channel defined on a radially outer surface of a stator lamination pack. The coolant flowpath channel includes: a first axial end defined radially outward from a first set of coils; and a second axial end defined radially outward from a second set of coils that is remote from the first set of coils.

In one embodiment, a cooling arrangement for an electric motor is disclosed. The arrangement includes a housing defining an inlet for coolant, and the housing partially defines a primary flowpath (F). A stator carrier is positioned adjacent to the housing, and the stator carrier partially defines the primary flowpath (F). A busbar carrier is positioned radially inward from the stator carrier, and the busbar carrier partially defines the primary flowpath (F). A stator is arranged inside of the stator carrier. A plurality of coils are also provided that include a first set of proximal coils arranged adjacent to the busbar carrier and at a first axial end of the stator, and a second set of remote coils arranged at a second axial end of the stator. The primary flowpath (F) is directed through a chamber defined by the housing, the stator carrier, and the busbar carrier and is divided into (i) a first flowpath (F1) directed radially inward to the first set of proximal coils, and (ii) a second flowpath (F2) directed axially outward to the second set of remote coils.

The arrangement further includes sealant applied between components of the arrangement. In one embodiment, the sealant is applied to at least (i) a first location defined between the housing and the busbar carrier, (ii) a second location defined on a radially outer surface of the busbar carrier, and (iii) a third location defined between the busbar carrier and the stator.

In one embodiment, the stator is formed as a lamination pack.

The second flowpath (F2) is partially defined by at least one axially extending channel formed on a radially outer surface of the stator. The at least one channel extends an entire axial extent of the stator. The at least one channel is formed as a semi-circular indentation on the stator. The at least one channel can include a plurality of channels that are circumferentially spaced apart from each other. A radially inner surface of the stator carrier partially defines the at least one channel.

In one embodiment, the arrangement further includes an O-ring mounted on the housing and surrounding the primary flowpath (F).

A radially outer surface of the busbar carrier includes protrusions that extend radially outward and restrict the primary flowpath (F).

Terminal ends of the first flowpath (F1) and the second flowpath (F2) are each dispersed circumferentially to the respective set of coils.

The first set of proximal coils and the second set of remote coils are each mounted in a respective bobbin, and each bobbin is positioned directly adjacent to the stator.

The arrangement can further include a valve in the housing that regulates the flow of fluid into the housing.

In another embodiment, a cooling system for an electric motor is provided. The cooling system includes a primary flowpath (F) originating inside of a housing of the electric motor. The primary flowpath (F) is directed from the housing through an O-ring attached to the housing, and the primary flowpath (F) directed into a chamber partially defined by the housing, a busbar carrier, and a stator carrier. The chamber divides the primary flowpath (F) into a first flowpath (F1) and a second flowpath (F2). The first flowpath (F1) extends radially inward from the chamber and extends towards a first set of coils that are adjacent to the busbar carrier. The second flowpath (F2) extends axially away from the chamber within an axially extending channel defined on a radially outer surface of a stator, and the second flowpath (F2) is directed towards a second set of coils. The second set of coils are remote from the first set of coils.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
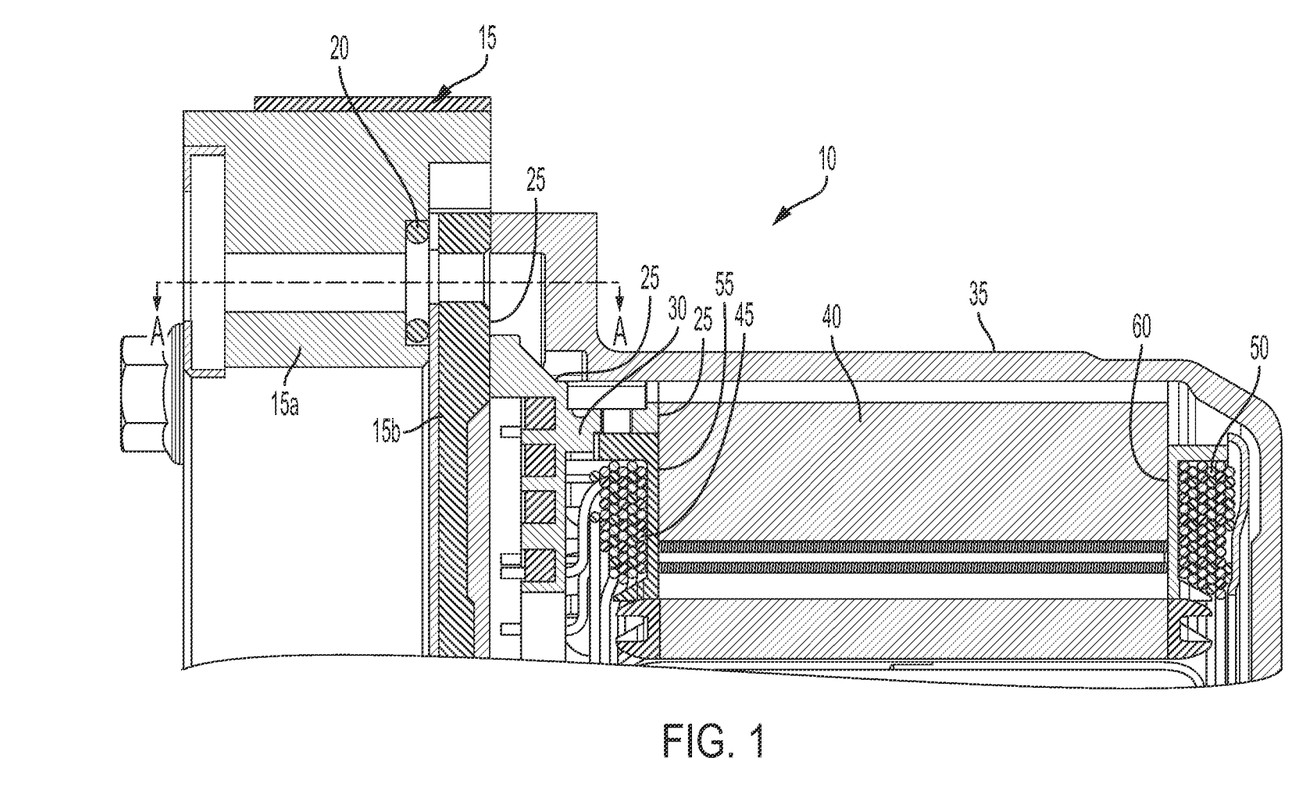
FIG. 1 is a side cross-sectional view of an electric motor including a cooling system according to the present disclosure.

Starting with FIG. 1, an electric motor 10 is generally illustrated that includes the following components: a housing 15; an O-ring 20; sealant 25; a busbar carrier 30; a stator carrier 35; a stator 40; proximal/left coils 45; remote/right coils 50; and bobbins 55, 60. More detailed features of each of these main components are described herein. Coolant is provided to the features of the electric motor 10 by a flowpath (F, F1, F2) and modifications to the electric motor 10 that are described in more detail herein. As used herein, the term coolant refers to any liquid or fluid that is directed through the electric motor 10, such as automatic transmission fluid (ATF).

The terms left and right are used herein with reference to the set of Figures. One of ordinary skill in the art would understand that these terms are relative based on a frame of reference. Accordingly, the term remote is associated with the right coils and the term proximal is associated with the left coils. The term remote is used herein with respect to relative positions of the components of the electric motor, and is used to refer to relative spacing between components or to a particular frame of reference.

The term busbar carrier 30 is used generally herein to refer to an electrical junction housing or carrier.

The term stator 40 is used generally to refer to any type of stator in this disclosure. In one embodiment, the stator 40 is formed as a laminated stack. One of ordinary skill in the art would understand that the stator 40 can be formed according to a variety of methods. The terms stator and stator lamination pack are generally used interchangeably herein.

Figure 2:
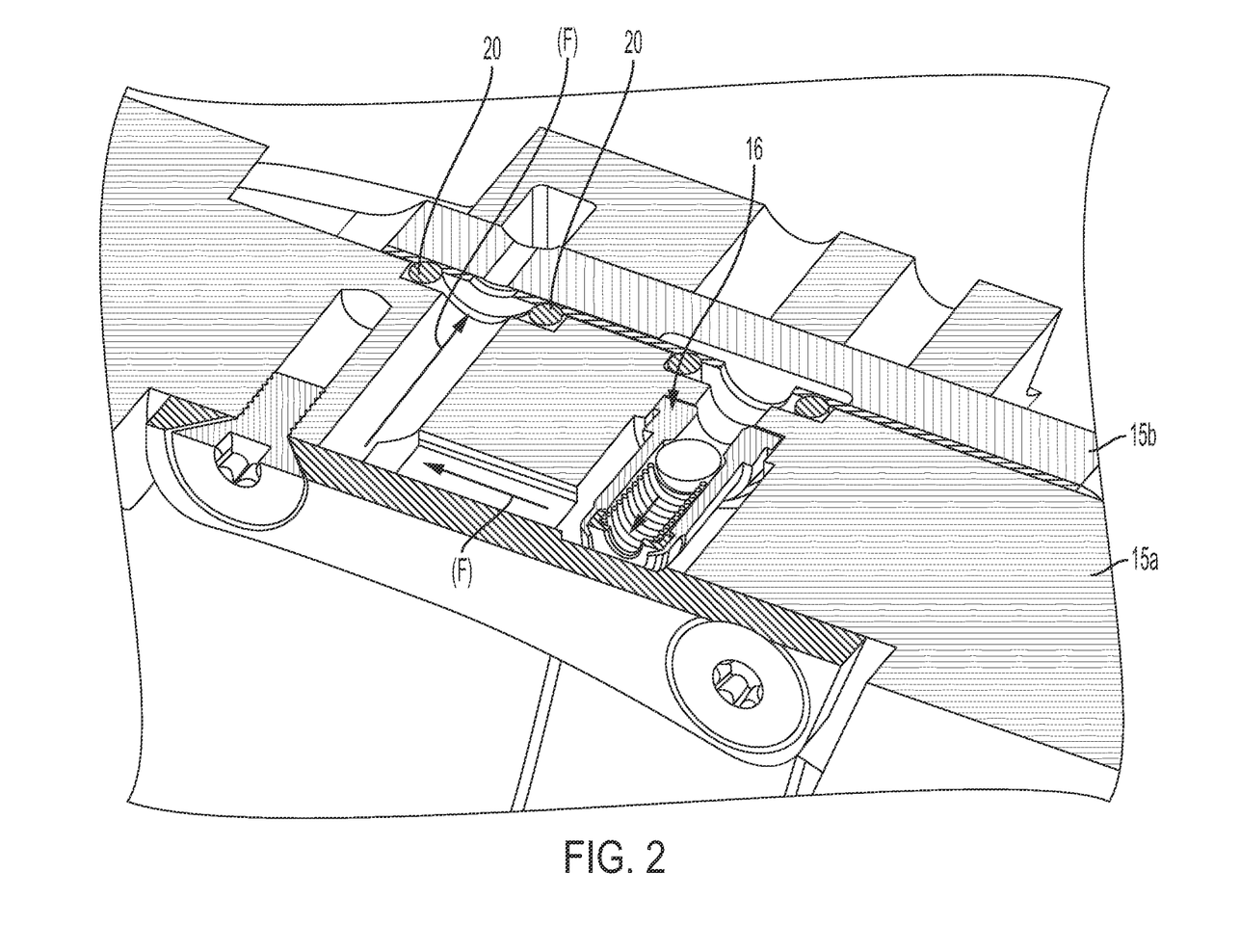
FIG. 2 is a cross-sectional view along line A-A from FIG. 1.
Figure 3A:
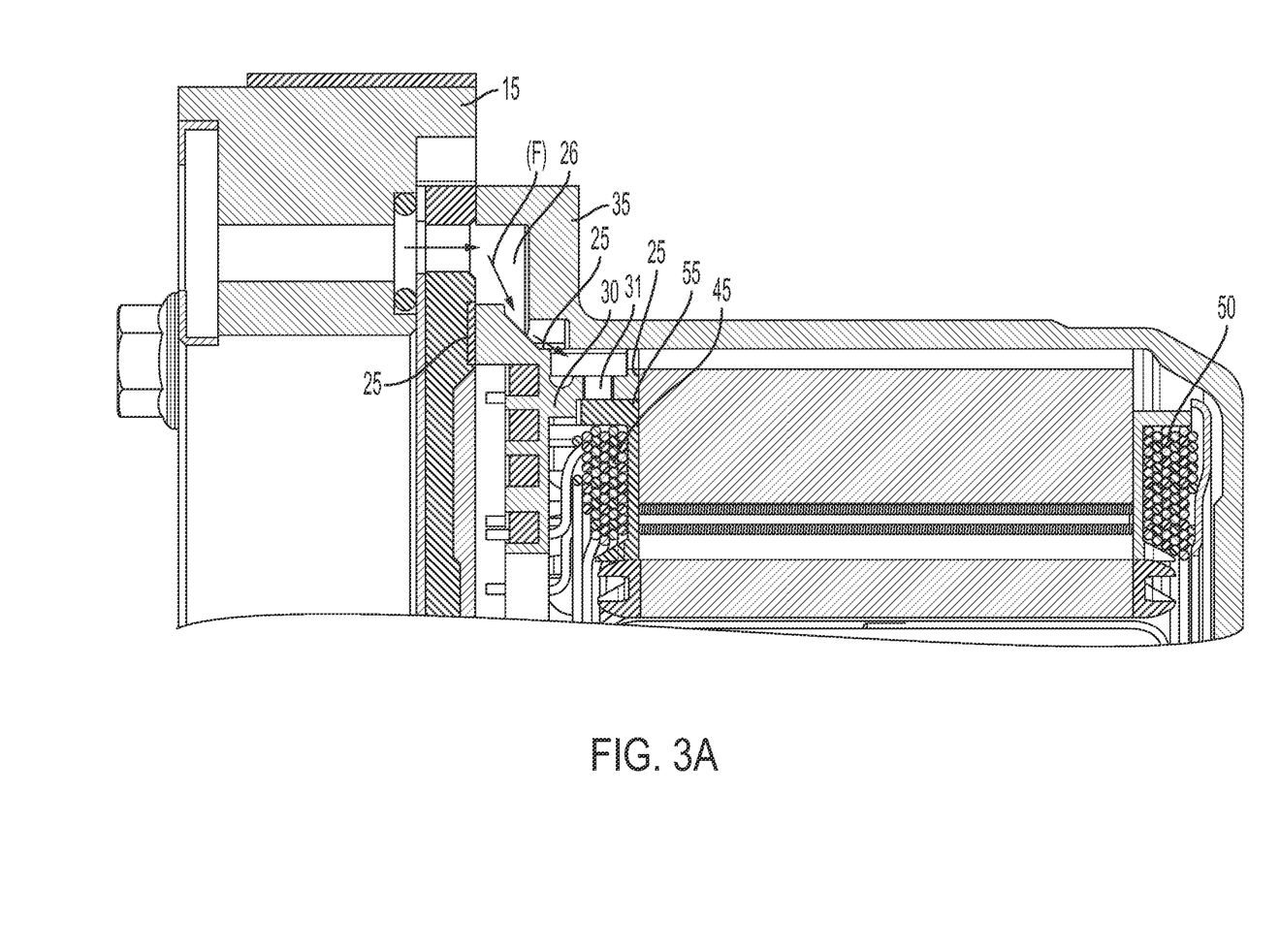
FIG. 3A is a cross-sectional side view of the electric motor and cooling system of FIG. 1, including annotations to show coolant flow path.
Figure 3B:
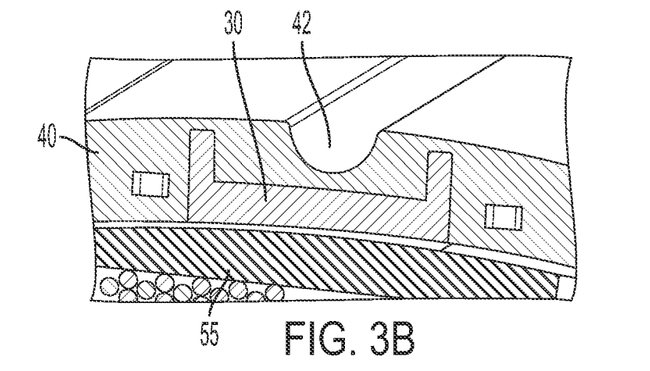
FIG. 3B is a perspective view of an interface between a stator, a busbar carrier, and a bobbin from FIG. 3A.
Figure 3C:
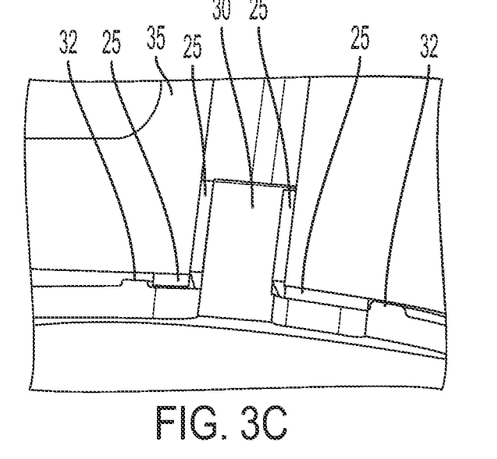
FIG. 3C is a perspective view of FIG. 3A showing a specific portion of a busbar carrier.
Figure 3D:
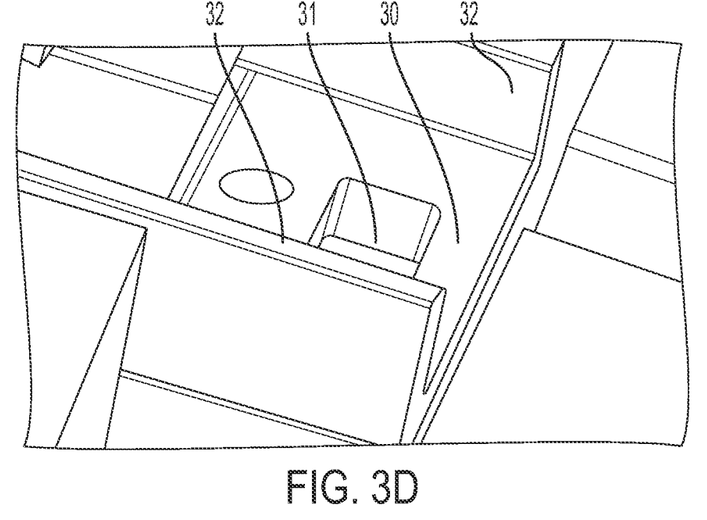
FIG. 3D is a magnified portion of FIG. 3A showing a perspective view of a busbar carrier in another region including an opening or passage for the coolant.

As shown in FIG. 2, the housing 15 includes a first housing component 15a and a second housing component 15b. The term housing 15 is used generically herein to refer to either the first housing component 15a or the second housing component 15b, or to an embodiment in which a single piece or unitary housing 15 is provided. One skilled in the art would understand that the exact shape or arrangement of the housing 15 can vary.

The first housing component 15a includes a valve 16 which serves as an inlet for the coolant. The valve 16 can include a closing body, seal, and any other known valve components capable of providing a controllable flowpath for coolant into the first housing component 15a. As shown in FIG. 2, the flowpath (F), sometimes referred to herein as a main or primary flowpath, is directed from the valve 16 towards an end face of the first housing component 15a and is re-directed in an opposite direction towards the other components of the electric motor 10. One of ordinary skill in the art would understand based on this disclosure that the flowpath (F) could flow unimpeded from the valve 16 towards the other components of the electric motor 10. FIG. 2 illustrates how the flowpath (F) generally is directed into the housing 15 and then out of the housing 15 towards the remainder of the electric motor 10, i.e. coils, etc.

FIGS. 3A-3D generally illustrates the main flowpath (F) from the first housing component 15a through the O-ring 20 towards the second housing component 15b and a three-piece chamber 26 defined partially by the housing 15, the busbar carrier 30, and the stator carrier 35. Protrusions 32 are formed on the busbar carrier 30 to provide interfering or blocking features that direct the flowpath (F) in a desired direction. Sealant 25 is provided at least in the locations indicated in FIGS. 3A-3C, and the combination of the sealant 25 and the protrusions 32 ensure that the flowpath (F) is generally directed radially downward towards the left/proximal coils 45 and axially towards the right/remote coils 50. The sealant 25 is applied to at least one of (i) a first location defined between the housing 15 and the busbar carrier 30, (ii) a second location defined on a radially outer surface of the busbar carrier 30, or (iii) a third location defined between the busbar carrier 30 and the stator 40. One of ordinary skill in the art would understand that sealant 25 can be applied to various other interfaces and locations in order to provide the desired orientation of the flowpath (F). In one embodiment, the sealant 25 is a gasket-grade sealant, such as a silicone-based sealant. The sealant 25 is compatible with the ATF. One skilled in the art would understand based on this disclosure that any combination of sealant 25 and/or mechanical protrusions or interference elements 32 can be provided to ensure that the flowpath (F) is directed from the housing 15 radially downward to the busbar carrier 30, through an opening or passage 31 defined in the busbar carrier 30, and radially downward towards the left/proximal coils 45 and the bobbin 55. The combination of sealant 25 and/or mechanical protrusions or interference elements 32 limit any flow of coolant in a circumferential direction while maintaining the flowpath (F) along the direction shown in the drawings.

Figure 4:
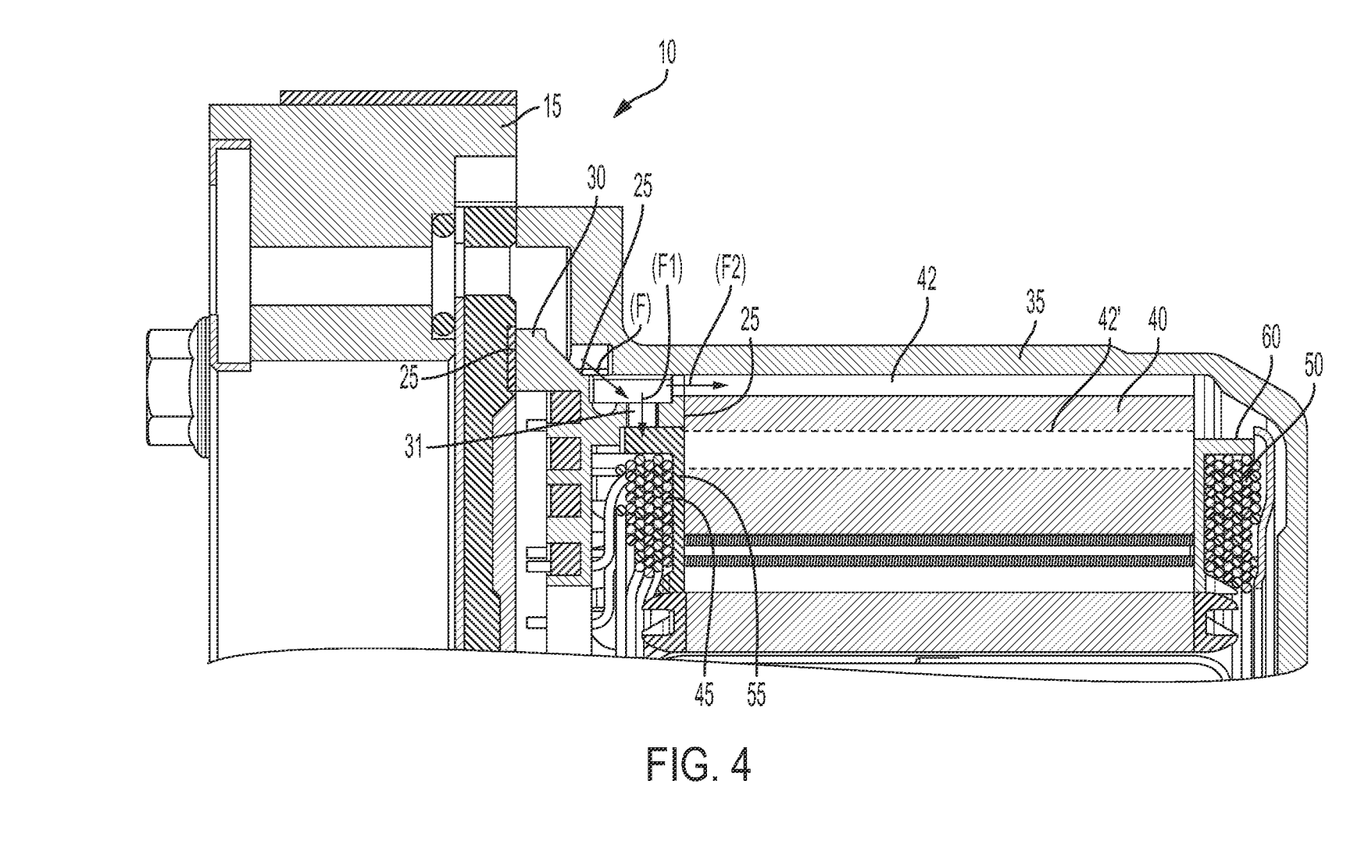
FIG. 4 is another cross-sectional view of the electric motor illustrating a coolant flowpath in a region of a busbar carrier and a stator carrier.

FIG. 4 illustrates the primary flowpath (F) advancing from the three-piece chamber in two directions: radially inward towards the left/proximal coils 45 (shown by a first flowpath (F1)) and axially outward towards the right/remote coils 50 (shown by a second flowpath (F2)).

Figure 5A:
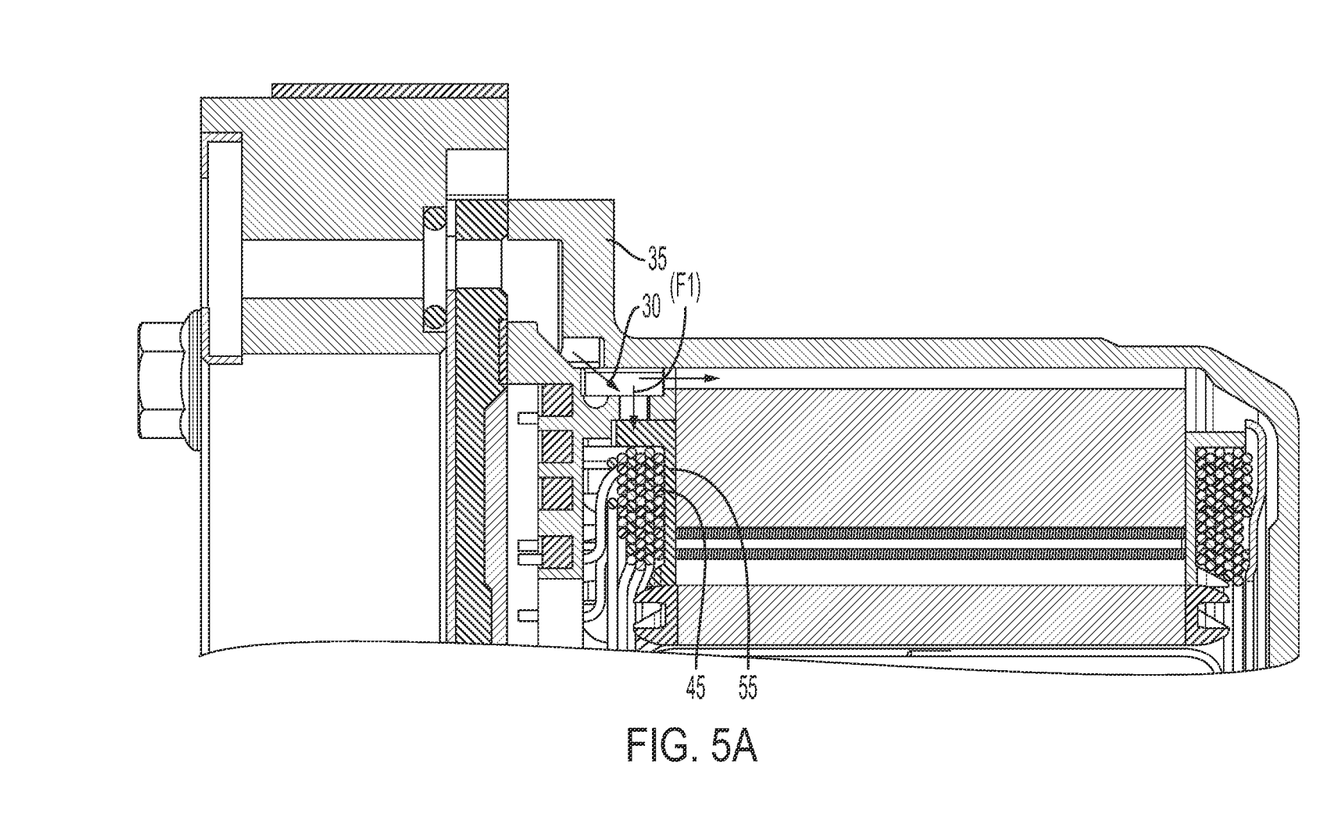
FIG. 5A is another cross-sectional view illustrating the coolant flowpath from the busbar carrier and the stator carrier down towards the bobbin and proximal/left coils.
Figure 5B:
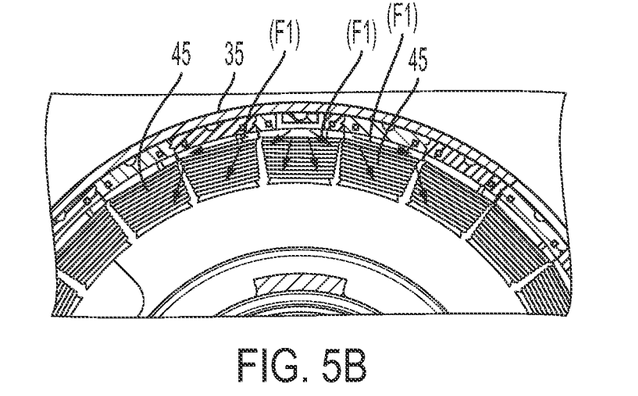
FIG. 5B is a front planar view of the coolant flowpath to the proximal/left coils.
Figure 5C:
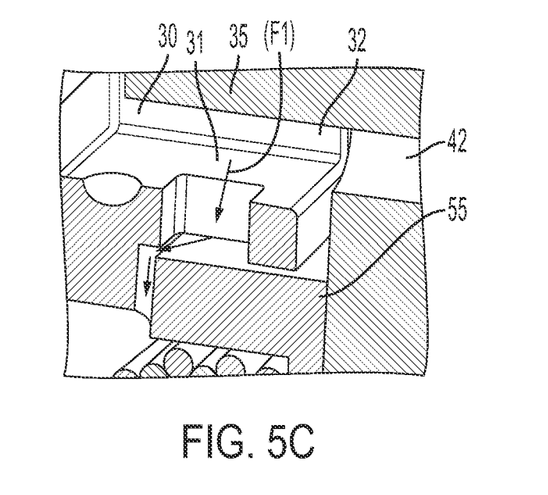
FIG. 5C is a magnified cross-sectional view showing the coolant flowpath from the busbar carrier down towards the proximal/left coils.

The first flowpath (F1) is directed towards bobbin 55 and the left/proximal coils 45, which is shown in more detail in FIGS. 5A-5C. The second flowpath (F2) is directed axially outwards towards the right/remote coils 50, which is shown in more detail in FIGS. 6A-6C.

As shown in FIG. 5A, the first flowpath (F1) is directed radially inward towards the left/proximal coils 45 and the bobbin 55 via the busbar carrier 30. FIG. 5C illustrates a magnified view of this junction to show how the first flowpath (F1) is directed between the busbar carrier 30 and the bobbin 55 towards the left/proximal coils 45. As shown in more detail in FIG. 5B, once the first flowpath (F1) reaches this junction, the first flowpath (F1) is then circumferentially distributed among the left/proximal coils 45.

Figure 6A:
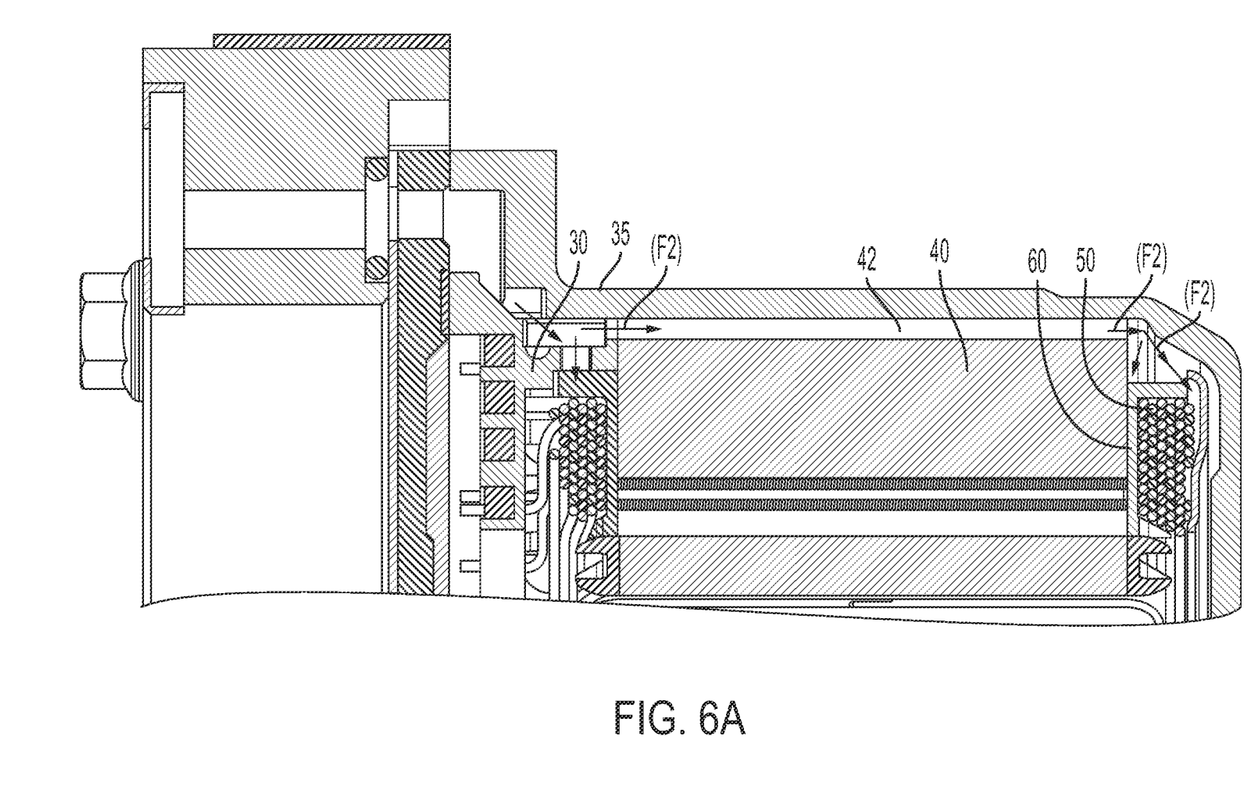
FIG. 6A is another cross-sectional view illustrating the coolant flowpath from the busbar carrier axially towards the remote/right coils.
Figure 6B:
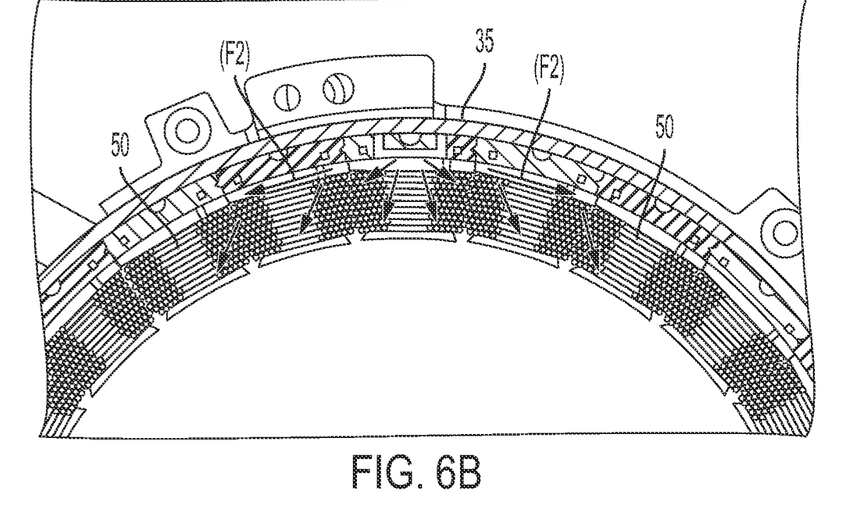
FIG. 6B is a front planar view illustrating the coolant flowpath to the remote/right coils.
Figure 6C:
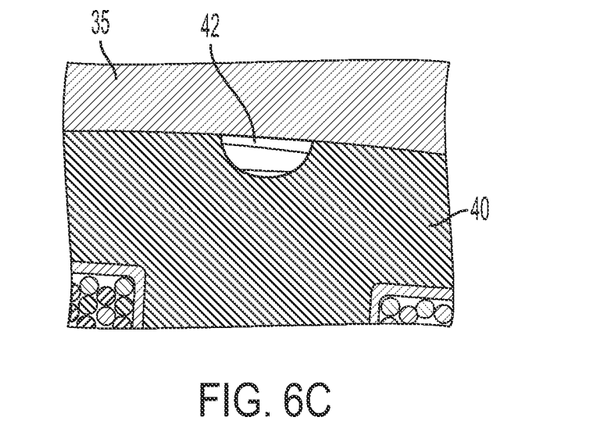
FIG. 6C is a magnified front view of a channel extending axially through a stator between the proximal/left coils and the remote/rightmost coils.

FIG. 6A-6C show the second flowpath (F2), which is directed along a channel 42 defined on the stator 40. The profile of the channel 42 is best shown in FIG. 6C, which illustrates the channel 42 as having a semi-circular shape. One of ordinary skill in the art would understand that the size, shape, geometry of the channel 42 can vary to accommodate a particular application's performance requirements. In one embodiment, the channel 42 is stamped into the stator lamination stack 40. However, other formation techniques can be used.

In one aspect, no flow restricting modifications, such as sealant 25 and/or mechanical protrusions or interference elements 32 are required in a region of the remote/right coils 50. In other words, the flowpath (F2) is unrestricted by any secondary or additional sealant or interference elements and is free to flow through the channel 42 and then radially inward and circumferentially to reach the remote/right coils 50.

Although the channel 42 is shown as extending radially inward from a radially outward face of the stator 40, one of ordinary skill in the art would understand that the location of the channel 42 can be modified. Multiple channels 42, 42' can be provided. For illustrative purposes, a second channel 42' is shown in dashed line in FIG. 4, although this second channel 42' would not be visible through the specific cross-section shown in FIG. 4. The channel 42 extends for an entire axial extent of the stator 40, such that an unobstructed path is defined between the busbar carrier 30 and the junction defined between the bobbin 60 holding the remote/right coils 50 and an axial endmost face of the stator carrier 35. FIG. 6B illustrates a similar feature as FIG. 5B, with respect to the second flowpath (F2) being directed circumferentially to the remote/right coils 50 and spraying coolant among the remote/right coils 50.

The arrangements disclosed herein generally provide an improved configuration to provide coolant to both the left/proximal coils 45 and the remote/right coils 50. Providing coolant to the proximal/left coils 45 generally provides more options and flexibility due to their proximity to the source of coolant in the housing 15, however providing coolant to the remote/right coils 50 is more complicated. The configuration disclosed herein does not enlarge or otherwise modify the overall footprint or space required by the electric motor 10, which is a critical design consideration. By providing the channel 42 in the stator 40, the present configuration also does not disturb any of the other structural features of the electric motor 10. The flowpaths (F1, F2) are provided by a combination of modifications to the shapes of the stator carrier 35 and the busbar carrier 30, use of sealant 25, and the channel 42.

A method of providing coolant to an electric motor 10 is also disclosed herein. The method generally includes supplying coolant to the housing 15, such as via the valve 16. The method includes directing the coolant through the housing 15 and an O-ring 20 into a multi-part chamber defined by the housing 15, the busbar carrier 30, and the stator carrier 35. From there, the method includes directing the primary flowpath (F) into two directions. Sealant 25 and protrusions 32 on the busbar carrier 30 are used to restrict the primary flowpath (F). The method includes directing the primary flowpath (F1) into a first flowpath (F1) directed radially inwardly towards a first set of coils, i.e. the proximal/left coils 45. The method also includes directing a second flowpath (F2) axially away from the housing 15 to a remote portion of the stator. The second flowpath (F2) is defined via the channel 42 defined on the stator 40. From there, the second flowpath (F2) is directed radially inward towards the remote/right coils 50.

The embodiments disclosed herein provide a standalone configuration or system, which eliminates the need for end-users to consider the interfaces between the various sub-components disclosed herein.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Electric motor 10
Housing 15
Valve 16
O-Ring 20
Sealant 25
Chamber 26
Busbar carrier 30
Passage 31
Protrusions 32
Stator carrier 35
Stator or stator lamination pack 40
Channel 42
Proximal/left coils 45
Remote/right coils 50
Bobbins 55, 60

What is claimed is:

1. A cooling arrangement for an electric motor, the arrangement comprising:
 a housing defining an inlet for liquid coolant, the housing partially defining a primary flowpath (F);
 a stator carrier positioned adjacent to the housing, the stator carrier partially defining the primary flowpath (F);
 a busbar carrier positioned entirely radially inward from and fully surrounded by the stator carrier, the busbar carrier partially defining the primary flowpath (F);
 a stator arranged inside of the stator carrier; and
 a plurality of coils including a first set of coils arranged adjacent to the busbar carrier at a first axial end of the stator, and a second set of coils arranged at a second axial end of the stator that is remote from the busbar carrier, wherein the primary flowpath (F) is directed through a chamber defined by the housing, the stator carrier, and the busbar carrier into (i) a first flowpath (F1) directed radially inward to the first set of coils, and (ii) a second flowpath (F2) directed axially outward to the second set of coils.

2. The arrangement of claim 1, further comprising sealant applied between components of the arrangement.

3. The arrangement of claim 2, wherein the sealant is applied to at least one of (i) a first location defined between the housing and the busbar carrier, (ii) a second location defined on a radially outward surface of the busbar carrier, or (iii) a third location defined between the busbar carrier and the stator.

4. The arrangement of claim 1, wherein the stator is formed as a lamination pack.

5. The arrangement of claim 1, wherein the second flowpath (F2) is partially defined by at least one axially extending channel formed on a radially outer surface of the stator.

6. The arrangement of claim 5, wherein the at least one axially extending channel extends an entire axial extent of the stator.

7. The arrangement of claim 5, wherein the at least one axially extending channel is formed as a semi-circular indentation on the stator.

8. The arrangement of claim 5, wherein the at least one axially extending channel includes a plurality of channels that are circumferentially spaced apart from each other.

9. The arrangement of claim 5, wherein a radially inner surface of the stator carrier partially defines a boundary of the at least one axially extending channel.

10. The arrangement of claim 1, further comprising an O-ring mounted on the housing and surrounding the primary flowpath (F).

11. The arrangement of claim 1, wherein a radially outer surface of the busbar carrier includes protrusions that extend radially outward and restrict the primary flowpath (F).

12. The arrangement of claim 1, wherein the first flowpath (F1) and the second flowpath (F2) are each dispersed circumferentially to the respective set of coils.

13. The arrangement of claim 1, wherein the first set of coils and the second set of coils are each mounted in a respective bobbin, and each bobbin is positioned directly adjacent to the stator.

14. The arrangement of claim 1, further comprising a valve in the housing that regulates a fluid flow rate into the housing.

15. A cooling system for an electric motor, the cooling system comprising:
a primary flowpath (F) originating inside of a housing of the electric motor, the primary flowpath (F) being directed from the housing through an O-ring attached to the housing, the primary flowpath (F) directed into a chamber partially defined by the housing, a busbar carrier, and a stator carrier, wherein the primary flowpath (F) is restricted via sealant applied to a first location defined on a radially outer surface of the busbar carrier to direct the primary flowpath (F) into the chamber, wherein the chamber divides the primary flowpath (F) into a first flowpath (F1) and a second flowpath (F2);
the first flowpath (F1) extending radially inward from the chamber and extending towards a first set of coils that are adjacent to the busbar carrier; and
the second flowpath (F2) extending axially away from the chamber within an axially extending channel defined on a radially outer surface of a stator, and the second flowpath (F2) is directed towards a second set of coils that are remote from the first set of coils.

16. The cooling system of claim 15, wherein the primary flowpath (F) is further restricted via sealant applied to at least one of a second location defined between the housing and the busbar carrier, or a third location defined between the busbar carrier and the stator.

17. The cooling system of claim 15, wherein the first set of coils and the second set of coils are each mounted in a respective bobbin, and each bobbin is positioned directly adjacent to the stator.

18. The cooling system of claim 15, wherein the first flowpath (F1) and the second flowpath (F2) are each dispersed circumferentially to the respective set of coils.

19. The cooling system of claim 15, wherein the channel extends an entire axial extent of the stator, and the channel is formed as a semi-circular indentation on the stator.

20. A coolant flowpath configuration for an electric motor, the coolant flowpath configuration comprising:
a coolant flowpath channel defined on a radially outer surface of a stator lamination pack, wherein the coolant flowpath channel includes:
a first axial end defined radially outward from a first set of coils, and a second axial end defined radially outward from a second set of coils that is remote from the first set of coils;
wherein the first axial end of the coolant flowpath channel receives a liquid coolant from a chamber partially defined by a housing, a busbar carrier, and a stator carrier of the electric motor, the busbar carrier positioned entirely radially inward from and fully surrounded by the stator carrier; and
wherein a radially outer surface of the busbar carrier includes protrusions positioned fully radially inward of the stator carrier and extending radially outward into the chamber to restrict a flow of the liquid coolant and direct the flow of the liquid coolant to the first axial end of the coolant flowpath channel.

* * * * *